US008664529B2

(12) United States Patent
Wang et al.

(10) Patent No.: US 8,664,529 B2
(45) Date of Patent: Mar. 4, 2014

(54) ULTRA HIGH PERFORMANCE CONNECTORS FOR POWER TRANSMISSION APPLICATIONS

(75) Inventors: Jy-An Wang, Oak Ridge, TN (US); Fei Ren, Oak Ridge, TN (US); Dominic F. Lee, Knoxville, TN (US); Hao Jiang, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 264 days.

(21) Appl. No.: 13/360,882

(22) Filed: Jan. 30, 2012

(65) Prior Publication Data

US 2013/0192870 A1    Aug. 1, 2013

(51) Int. Cl.
*H02G 15/192* (2006.01)

(52) U.S. Cl.
USPC ............................................................ 174/90

(58) Field of Classification Search
CPC ................................................. H02G 15/192
USPC ............................................................ 174/90
See application file for complete search history.

(56) References Cited

U.S. PATENT DOCUMENTS

| 4,944,699 | A | 7/1990 | Velke, Sr. et al. |
| 6,530,794 | B2 | 3/2003 | Littlewood |
| 6,805,596 | B2 | 10/2004 | Quesnel et al. |
| 7,655,863 | B2 | 2/2010 | Kossak |
| 7,658,655 | B2 | 2/2010 | Waltz |
| 2008/0176461 | A1 | 7/2008 | Waltz |

FOREIGN PATENT DOCUMENTS

| CN | 2239086 Y | 10/1996 |
| CN | 2461166 | 11/2001 |
| KR | 1020100063906 | 12/2004 |

OTHER PUBLICATIONS

M. Runde, et al., "Compression Connectors for Stranded Aluminum Power Conductors," IEEE Xplore, 2004, pp. 933-942, vol. 19, Issue 3 . . . .
B.H. Connell & G.J. Davidson, "Developments in Overhead Line Connector Systems," IEEE Xplore, 1988, pp. 27-31.
John Jy-An Wang, et al., "The Effective Lifetime of ACSR Full Tension Splice Connector Operated at Higher Temperature," http:/info.oml.gov/sites/publications/files/Pub 12083.pdf.
John Jy-An Wang, et al., "The Integrity of ASCR Full Tension Splice Connector at Higher Operation Temperature," IEEE Transations on Power Delivery, 2008, pp. 1158-1165, vol. 23, No. 2.
John Jy-An Wang, et al., "The Lifetime Estimate for ACSR Single-Stage Splice Connector Operating at Higher Temperatures," IEEE Transactions on Power Delivery, 2011, pp. 1317-1325, vol. 26, No. 3.

*Primary Examiner* — Timothy Thompson
*Assistant Examiner* — Charles Pizzuto
(74) *Attorney, Agent, or Firm* — Colin L. Cini

(57) ABSTRACT

Disclosed are several examples of an apparatus for connecting the free ends of two electrical power transmission lines having conductor strands disposed around a central, reinforcing core. The examples include an inner sleeve having a body defining an inner bore passing through an axially-extending, central axis, an outer rim surface disposed radially outward from the central bore, and one or more axially-extending grooves penetrating the body at the outer rim surface. Also included is an outer splice having a tubular shaped body with a bore passing coaxially through the central axis, the bore defining an inner rim surface for accepting the inner sleeve. The inner bore of the inner sleeve accepts the reinforcement cores of the two conductors, and the grooves accept the conductor strands in an overlapping configuration so that a majority of the electrical current flows between the overlapped conductor strands when the conductors are transmitting electrical current.

14 Claims, 13 Drawing Sheets

ULTRA HIGH PERFORMANCE CONNECTORS FOR POWER TRANSMISSION APPLICATIONS

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

CROSS-REFERENCE TO RELATED APPLICATIONS

None.

THE NAMES OF THE PARTIES TO A JOINT RESEARCH AGREEMENT

None.

BACKGROUND OF THE INVENTION

1. Field of the Invention

The present disclosure relates to electrical conductors and more specifically to a connector for joining two segments of electrical conductors.

2. Description of the Related Art

Most of the developed countries have centralized power generation facilities fueled by carbon-based fuels or renewable energy sources. The electrical voltage generated by these facilities is: stepped up by a transformer; distributed over vast distances via high tension, overhead conductors; stepped down in voltage at a substation; and, finally distributed to individual utility customers. The majority of overhead transmission conductors in use today are aluminum conductors wound around steel-reinforced cores. These are referred to as aluminum conductor steel reinforced (ACSR) conductors. Aluminum material is used for conductors, because of its light weight and low cost when compared to other materials such as copper. ACSRs are designed to operate at upper temperatures as high as 100° C. (212° F.) and, for limited periods of time (e.g., emergencies), at temperatures as high as 125° C. (257° F.). These temperature limits constrain the thermal rating of a typical 230-kV line to about 400 MVA.

ACSR conductors generally span between spaced-apart towers for distances of up to fifty miles or more. Because of these vast distances, individual conductor segments are often joined together by connectors. Tension loads imparted on these connectors are affected by: the weight of the joined conductors themselves; the ambient temperature of the environment; water and ice accumulation; oscillations; and extreme wind loads for example.

A conventional ACSR connector is illustrated in FIG. 1 of the accompanying drawings. Here, a single stage, compression style connector 100 is used to join two conductor segments 102a, 102b having a series of outer conducting strands 104a, 104b coiled around reinforcing inner cores 106a, 106b. An aluminum outer splice 108 and inner core grip or cross wire (not shown) are assembled and compressed together with a hydraulic press and die or, in some cases, imploded together with an explosive charge to gain the required pre load compression in the connector 100. A finite element analysis of the connector 100 from the previous research work indicated that approximately seventy-seven percent of the residual stress at the steel core/core-grip interface is relaxed when the die is removed at the end of the compressing process. For further details of the analysis, please see the following reference [1] Jy-An Wang, Edgar Lara-Curzio, Thomas King, Joe Raziano, John Chan, "The Integrity of ACSR Full Tension Splice Connector at Higher Operation Temperature", IEEE Transactions on Power Delivery, 2008, Vol. 23(2), pp. 1158-1165, which is hereby incorporated by reference.

Please note that a majority of the electrical current flowing between the two, ACSR conductor segments 102a, 102b is actually transferred through the outer splice 108. Because the outer strands 104a, 104b do not overlap one another in the radial or axial direction, as illustrated by the hidden lines, the current must flow through the outer splice 108. The flow of current through the outer splice 108 increases its temperature and, due to thermal expansion, the outer splice 108 expends in diameter slightly. This slight increase in the diameter of the outer splice 108 reduces the compressive preload of the entire connector 100, which can lead to increased electrical resistance, arching, corrosion and eventually to failure of the connector 100. As a result of ever-increasing power demands, including the operation of transmission lines at higher temperatures, there are concerns about the integrity of compression-type splice connectors.

Despite the teachings of the prior art, improvements in connector design are required to support the increased power demands of the $21^{st}$ century.

BRIEF SUMMARY OF THE INVENTION

Disclosed are several examples of an apparatus for connecting the free ends of two segments of electrical power transmission lines having conductor strands disposed around a central, reinforcing core. The examples include an inner sleeve having a body defining an inner bore passing through an axially-extending, central axis, an outer rim surface disposed radially outward from the central bore. In some examples, one or more axially-extending grooves penetrate the body at the outer rim surface. Also included is an outer splice having a tubular shaped body with a bore passing coaxially through the central axis, the bore defining an inner rim surface for accepting the inner sleeve. The inner bore of the inner sleeve accepts the reinforcement cores of the two conductors, and the grooves accept the conductor strands in an overlapping configuration so that a majority of the electrical current flows between the overlapped conductor strands when the conductors are transmitting electrical current.

Also disclosed is a method for connecting the free ends of two electrical power transmission lines having conductor strands disposed around a central, reinforcing core. This method includes the steps of: a) providing an inner sleeve having a body with an inner bore passing through an axially-extending, central axis, an outer rim surface disposed radially outward from the central bore, and one or more axially-extending grooves in the body at the outer rim surface and, an outer splice having a tubular shaped body with a bore passing coaxially through the central axis, the bore defining an inner rim surface for accepting the inner sleeve; b) inserting a first one of the two electrical power transmission lines into a first end of the outer splice such that the reinforcing core enters the inner bore of the inner sleeve and the conductor strands enter the axially-extending grooves; c) inserting a second one of the two electrical power transmission lines into a second end of the outer splice such that the reinforcing core enters the inner bore of the inner sleeve and the conductor strands enter the axially-extending grooves and overlap the conductor strands of the first one of the electrical power transmission lines; and
d) crimping the outer spice.

BRIEF DESCRIPTION OF THE SEVERAL VIEWS OF THE DRAWINGS

A more complete understanding of the preferred embodiments will be more readily understood by reference to the following detailed description when considered in conjunction with the accompanying drawings, which are of no particular scale, where like numerals indicate common elements among the various examples.

DETAILED DESCRIPTION OF THE INVENTION

Figure 1:
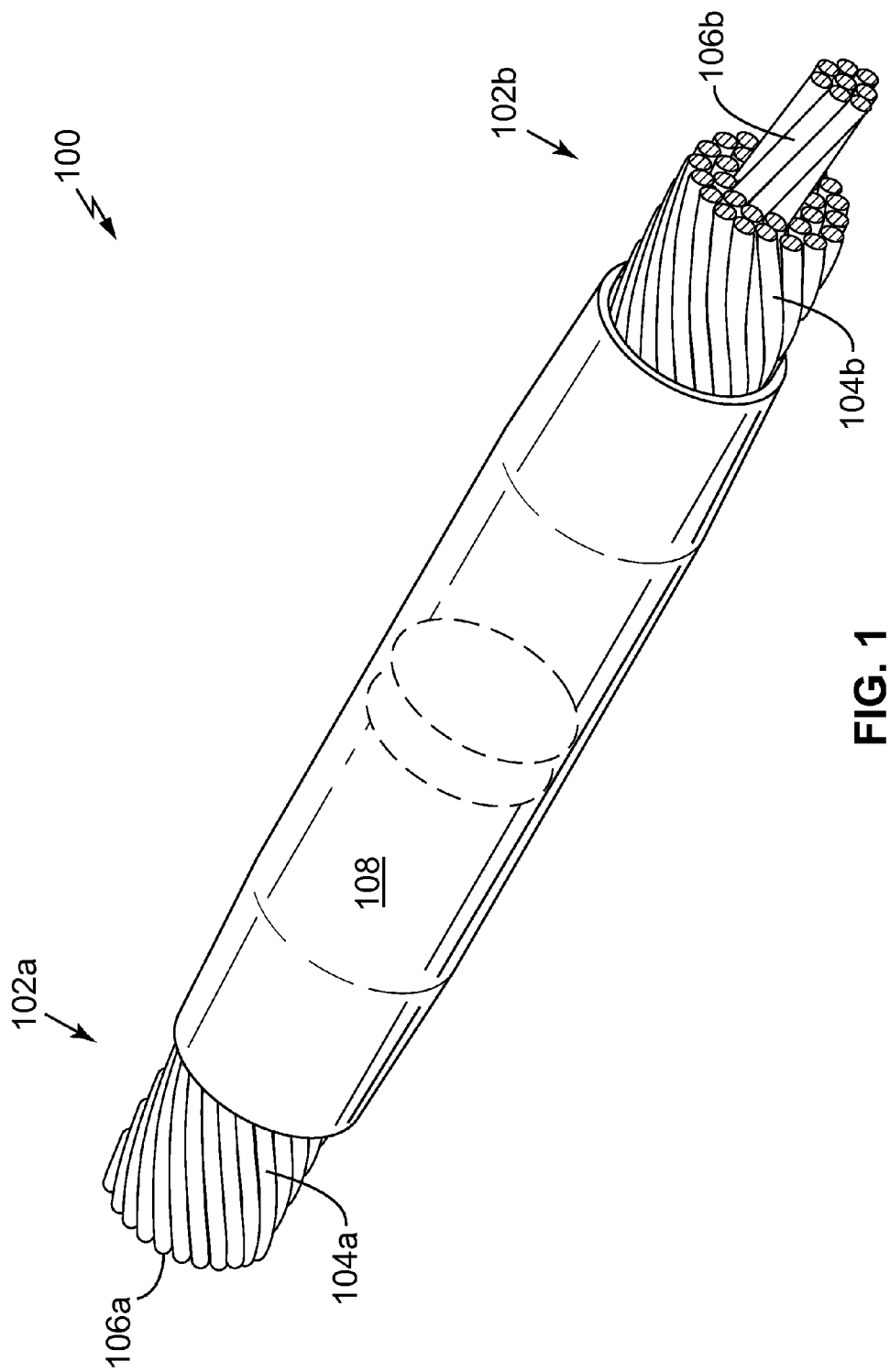
FIG. 1 illustrates a prior art, single-stage, compression style connector assembly.
Figure 2:
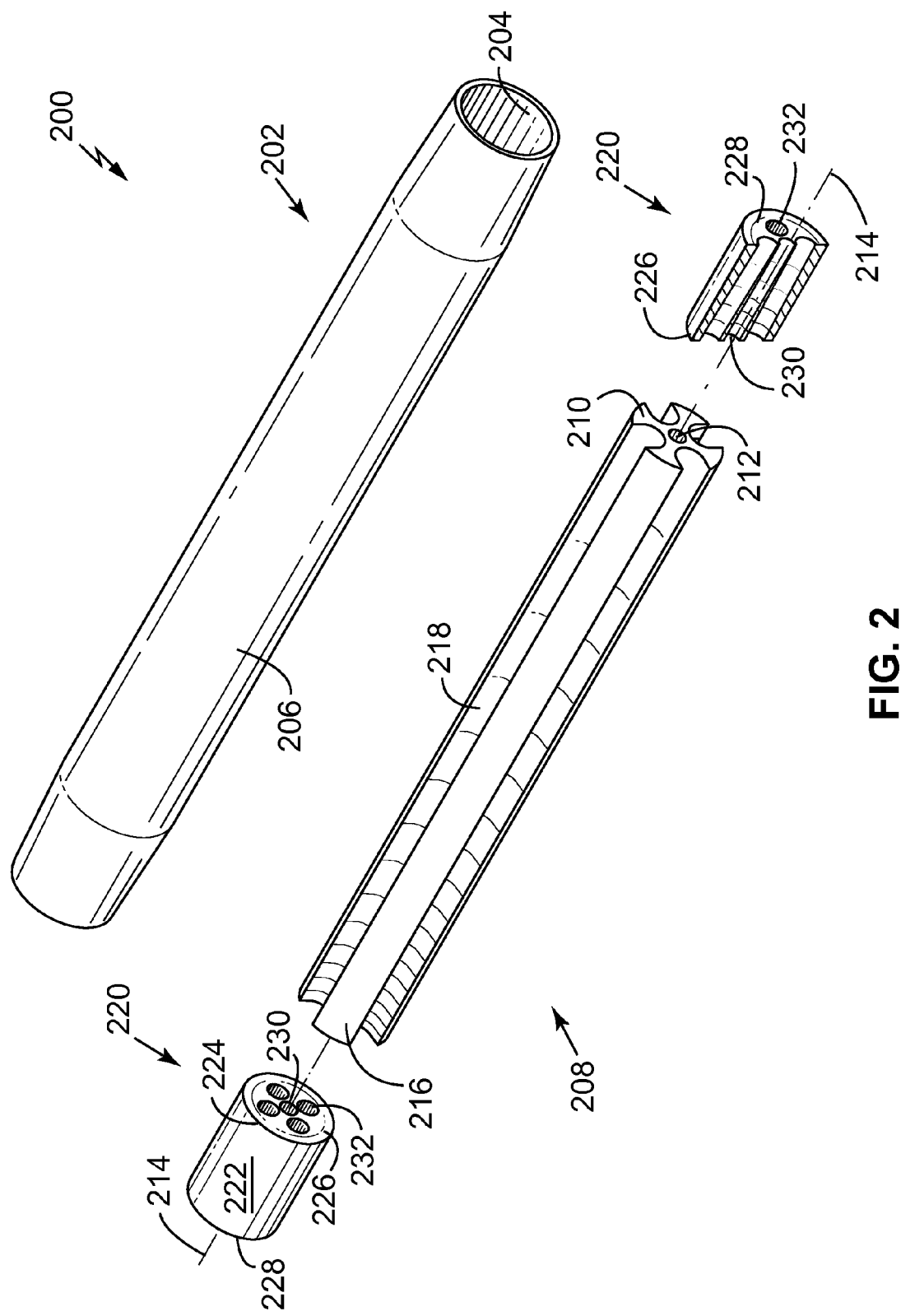
FIG. 2 illustrates an exploded, partial sectional, view of a single-stage, compression style connector according to an example of the present disclosure.

With reference now to FIG. 2, a single-stage connector 200 according to an example of the present disclosure is illustrated. In this example, an outer splice 202 has a tubular shaped body with an inner diameter surface 204, an outer diameter surface 206, and an axial length. In this example, the axial length of the outer splice 202 is approximately 24 inches (61 cm), but other lengths may also be used. The inner diameter surface 204 is sized to accept an inner sleeve 208 that has a body 210 defining an inner bore 212 passing through an axially-extending, central axis 214. An outer rim surface 216 is disposed radially outward from the central bore 212, and one or more axially-extending grooves 218 penetrate into the body 210 at the outer rim surface 216. In this example, four, equally spaced, axially-extending grooves 218 are shown; however, in other examples, more or less grooves 218 are contemplated. The grooves 218 may have a concave-shaped bottom surface (shown), a convex-shaped bottom surface (FIG. 13), or the bottom surface may be otherwise shaped (e.g., flat, V-shaped). An end cap 220 has a body 222 with an outer rim surface 224, an inside end 226, an outside end 228, and an inner bore 230 passing coaxially through the central axis 214. One or more conductor-guiding apertures 232 extend axially through the body 222 between the outside end 228 and the inside end 226. In this example, four conductor-guiding apertures 232 are shown, but other numbers are contemplated. In some examples, such as the example of the illustration, the conductor-guiding apertures 232 are circular shaped and inclined at an angle to the central axis 214.

Figure 3:
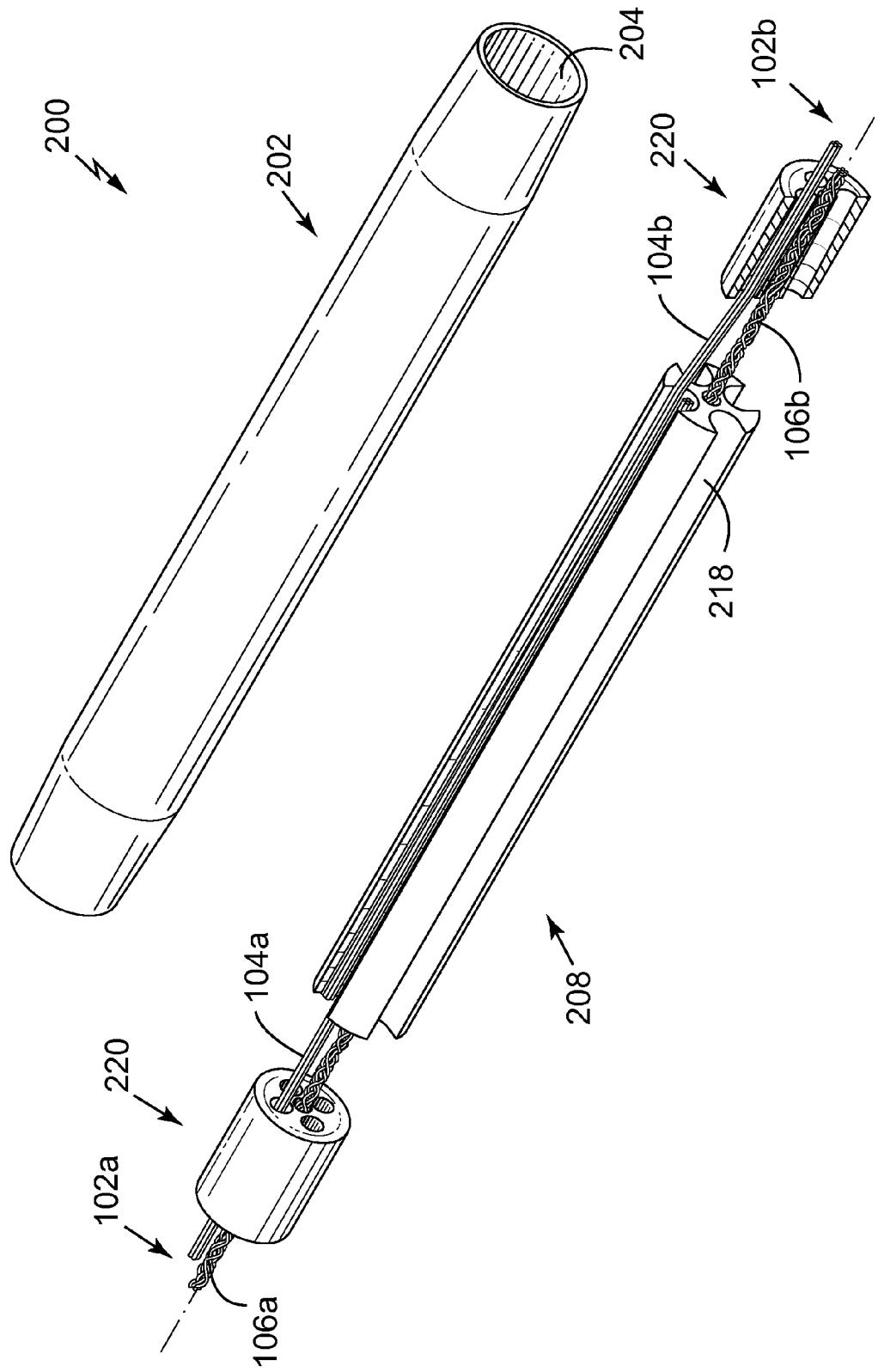
FIG. 3 illustrates an exploded, partial sectional, view of the connector assembly of FIG. 2 with certain elements of two conductors removed to add clarity.

With reference now to FIGS. 2 and 3, we'll discuss the assembly of the present example. Here, the steel reinforcing cores 106a-106b of the two conductors 102a, 102b, are first inserted through the inner bores 230 of the end caps 220 and then into the inner bore 212 of the inner sleeve 208. The cores 106a, 106b may be cross wired inside the sleeve 208 as is known in the art or may be simply butted together. The outer strands 104a, 104b are first inserted through the conductor guide apertures 232 in the end caps 220 and then into the axially-extending grooves 218 in the inner sleeve 208. Here, the grooves 218 accept the outer strands 104a, 104b in an overlapping configuration so that a majority of the electrical current flows between the overlapped outer strands 104a, 104b when the conductors 102a, 102b are transmitting electrical current. Since a majority of the current flows between the overlapped outer strands 104a, 104b, less current flows directly through the outer splice 202 as in the prior art connector 100. Note that, in the illustration of FIG. 3, only a portion of the outer strands 104a, 104b are shown for clarity of the various features. Next, the outer splice 202 is guided over the inner sleeve 208 and the end caps 220 to complete the initial assembly. Once the connector 200 is initially assembled, a radially inward, single stage, compression force is applied through a die via a hydraulic press, by implosion, or by any other crimping technique known in the art.

Figure 4:
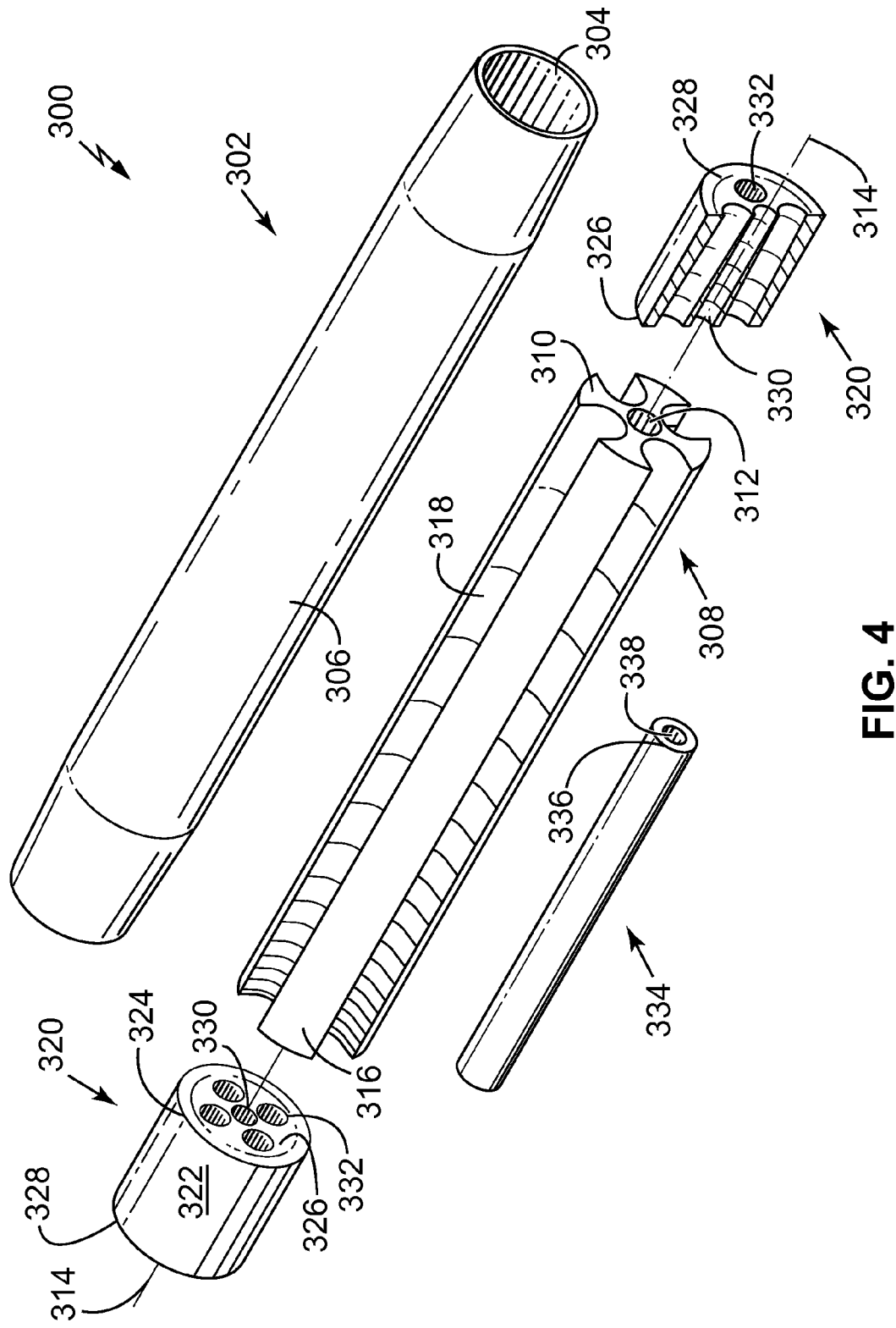
FIG. 4 illustrates an exploded, partial sectional, view of a dual-stage, compression style connector according to an example of the present disclosure.
Figure 5:
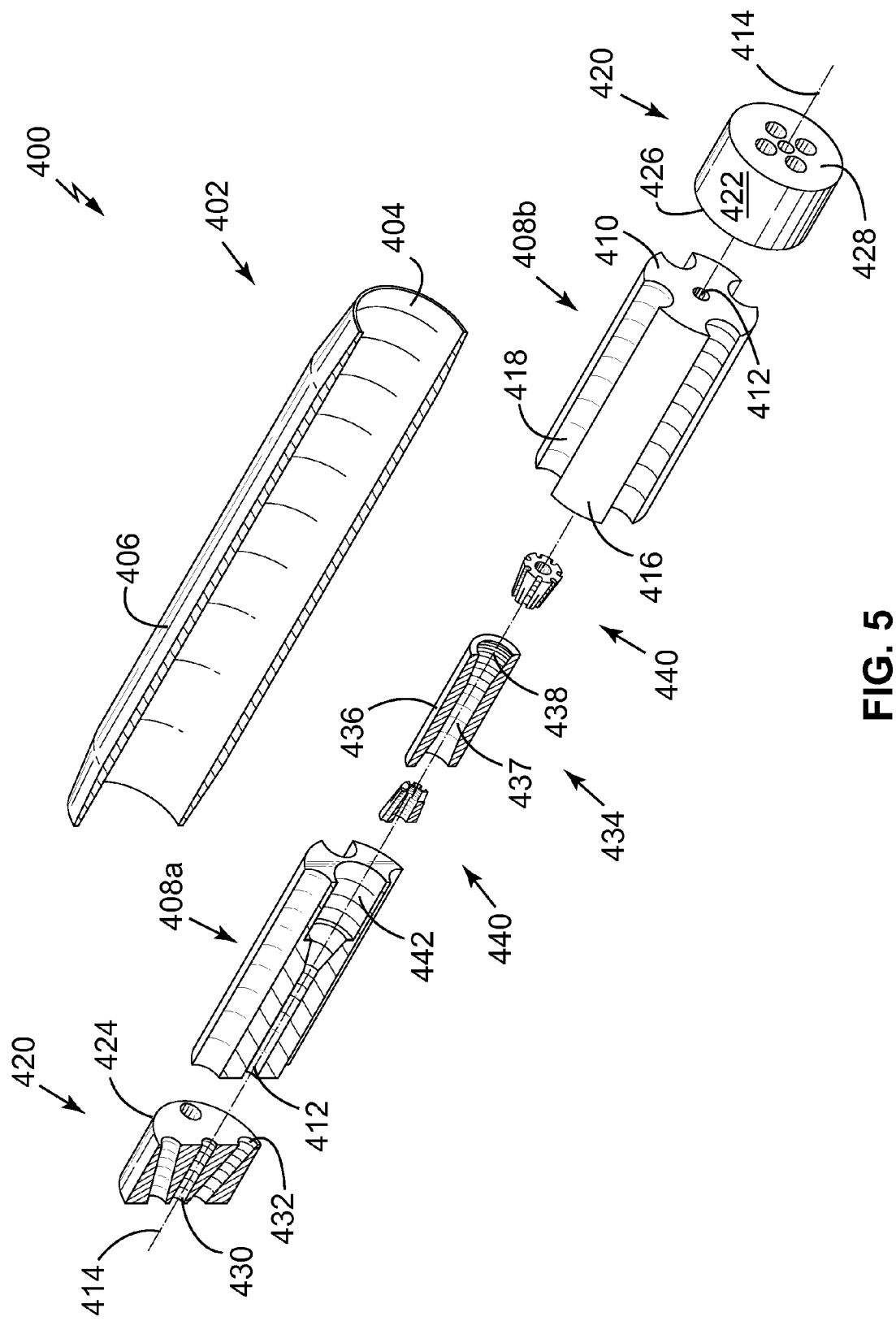
FIG. 5 illustrates an exploded, partial sectional, view of a self-locking, compression style connector according to an example of the present disclosure.
Figure 6:
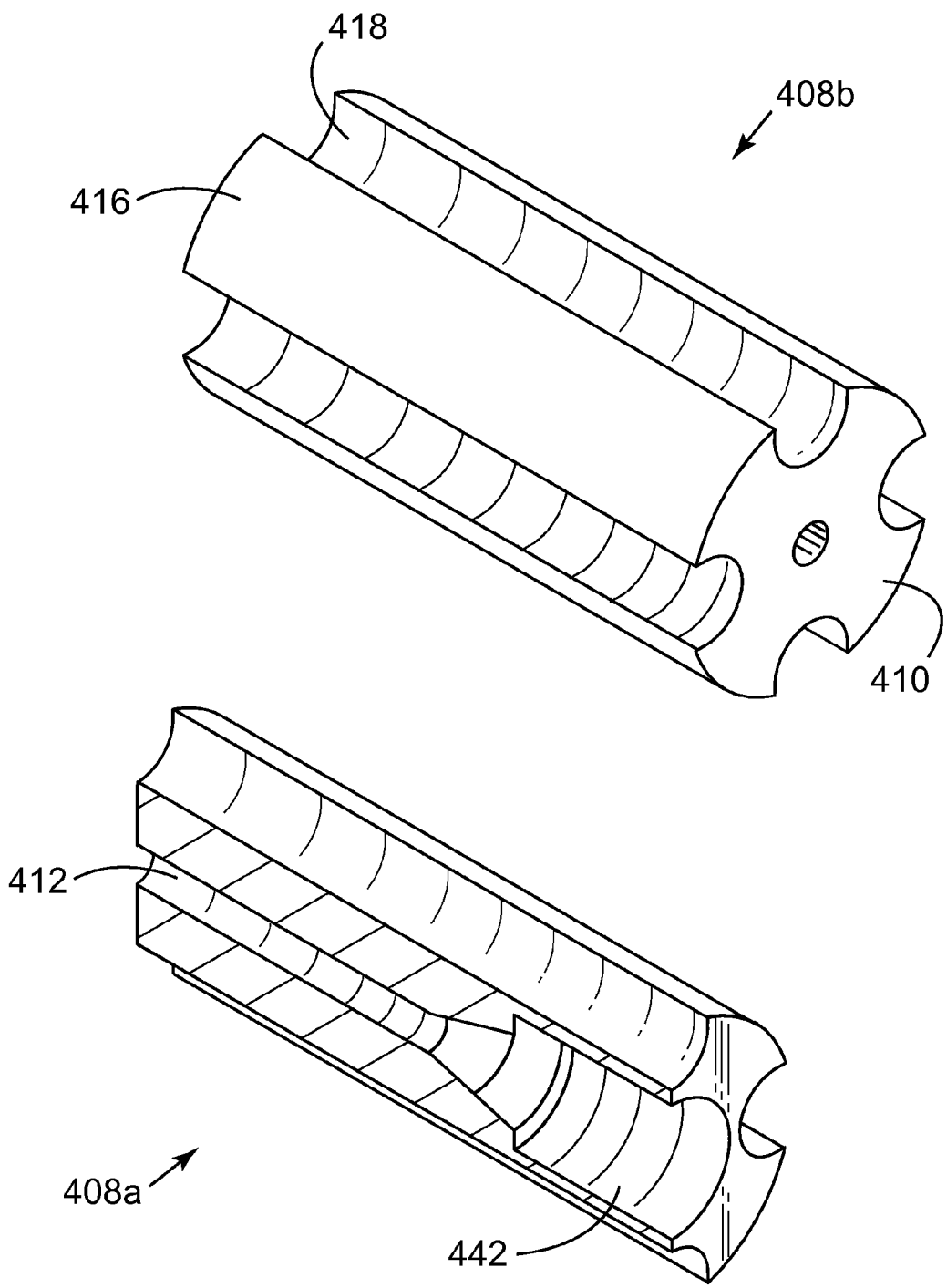
FIG. 6 illustrates a detailed view of an exemplary inner sleeve of the connector of FIG. 5.
Figure 7:
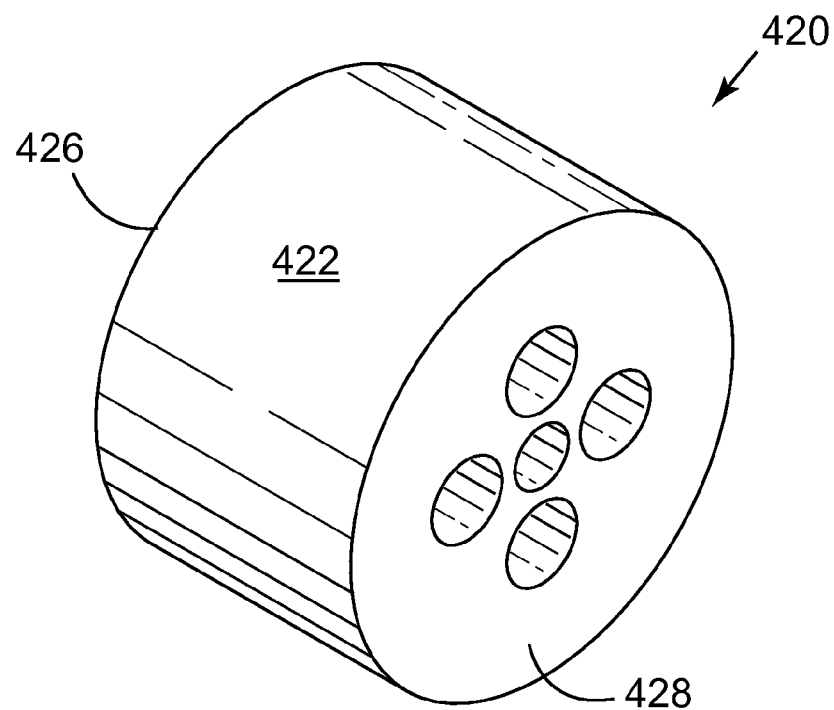
FIG. 7 illustrates a detailed view of an exemplary end cap of the connector of FIG. 5.
Figure 7:
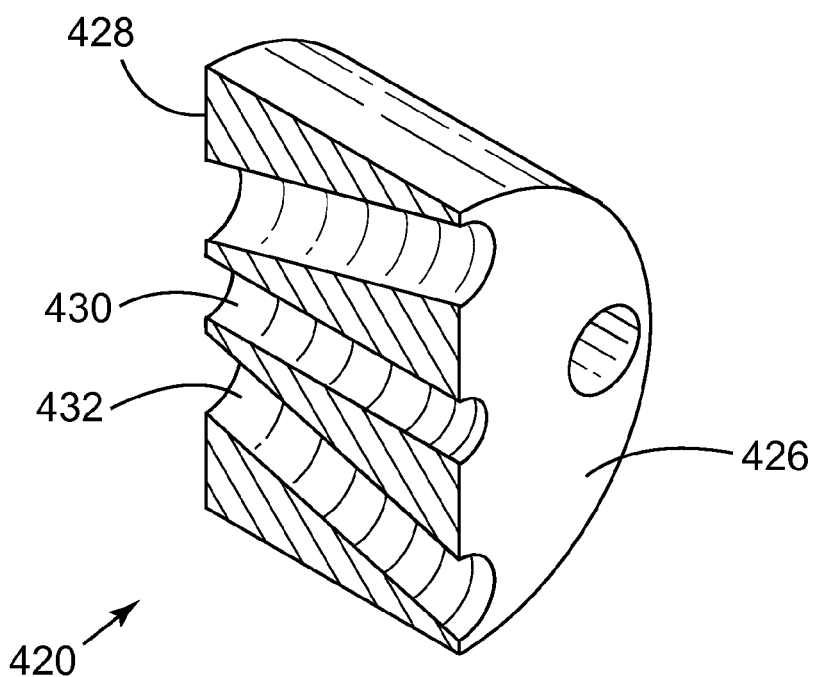
Figure 8:
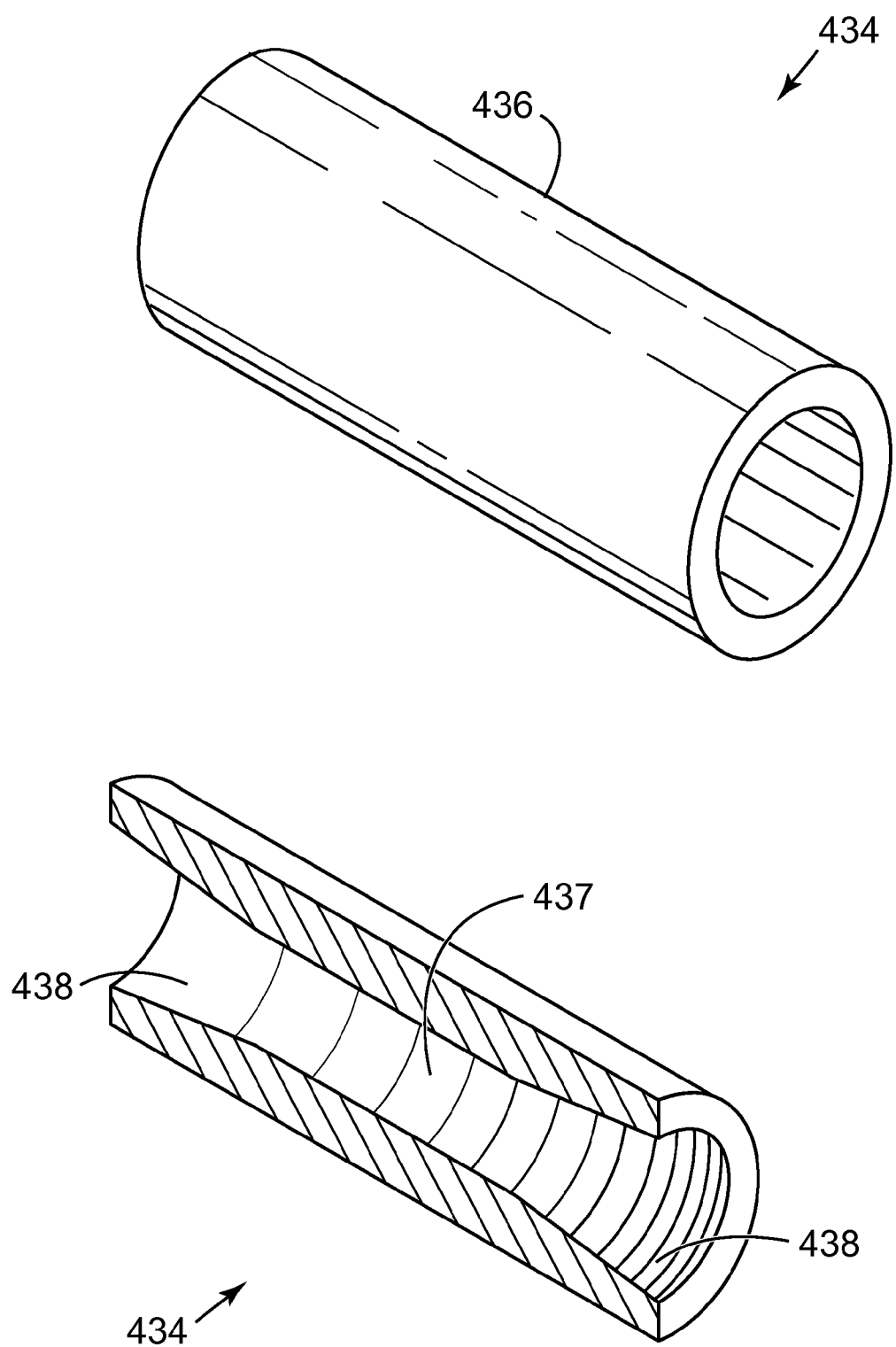
FIG. 8 illustrates a detailed view of an exemplary anchor block of the connector of FIG. 5.
Figure 9:
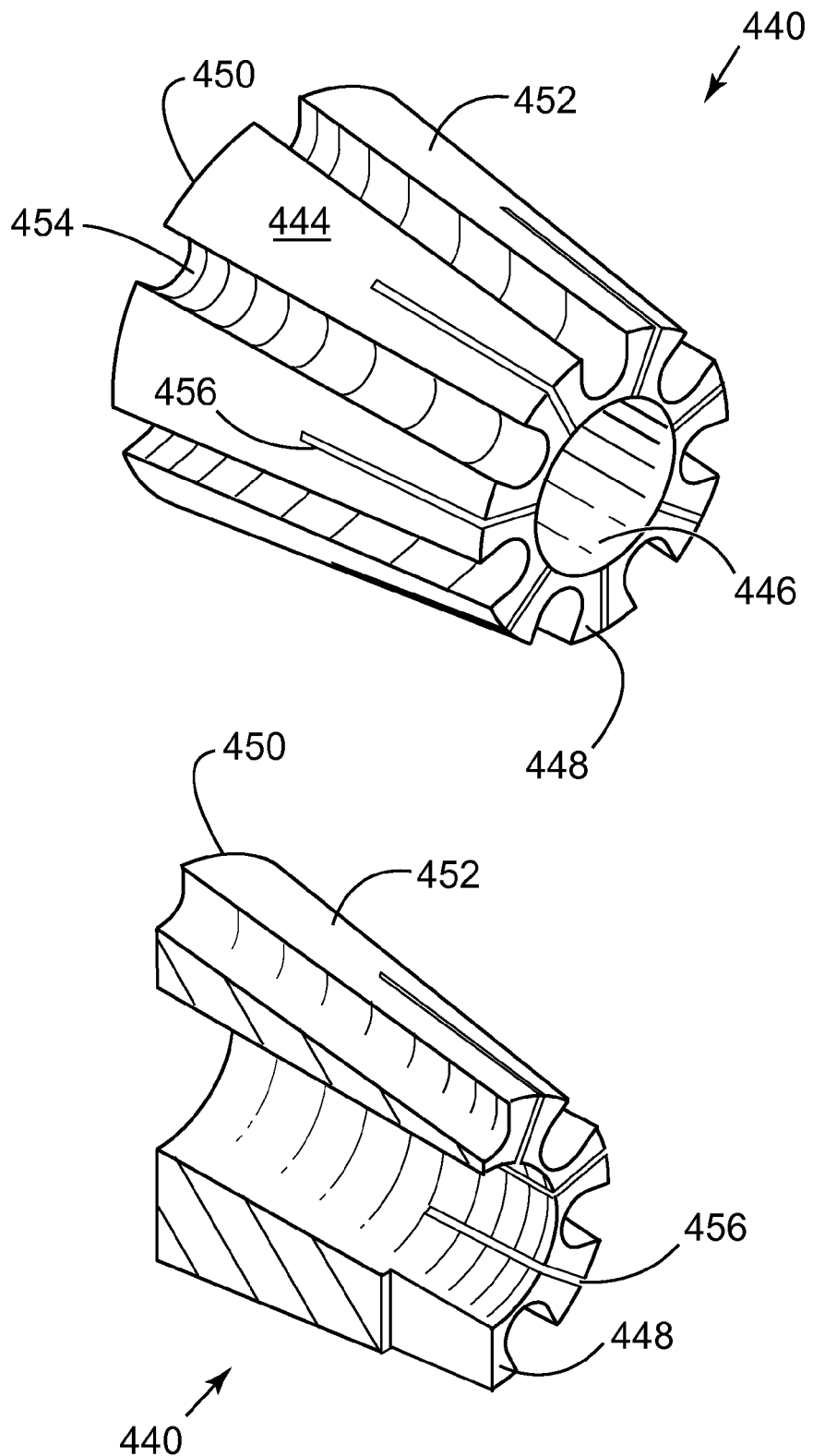
FIG. 9 illustrates a detailed view of an exemplary wedge block of the connector of FIG. 5.

Referring now to FIG. 4, a two-stage connector 300 according to another example of the present disclosure is illustrated. In this example, an outer splice 302 has a tubular shape with an inner diameter surface 304, an outer diameter surface 306, and an axial length. In this example, the axial length of the outer splice 302 is approximately 24 inches (61 cm), but other lengths may also be used. The inner diameter surface 304 is sized to accept an inner sleeve 308 having a body 310 defining an inner bore 312 passing through an axially-extending, central axis 314. An outer rim surface 316 is disposed radially outward from the central bore 312, and one or more axially-extending grooves 318 penetrate into the outer rim surface 316. In this example, four axially-extending grooves 318 are shown; however, in other examples, more or less grooves 318 are contemplated. The grooves 318 may have a concave-shaped bottom surface (shown), a convex-shaped bottom surface (FIG. 13), or the bottom surface may be otherwise shaped (e.g., flat, V-shaped). An end cap 320 has a body 322 with an outer rim surface 324, an inside end 326, an outside end 328, and an inner bore 330 passing coaxially through the central axis 314. One or more conductor-guiding apertures 332 extend axially through the body 322 between the outside end 328 and the inside end 326. In this example, four conductor-guiding apertures 332 are shown, but other numbers are contemplated. In some examples, such as the example of the illustration, the conductor-guiding apertures 332 are inclined at an angle to the central axis 314.

In addition to the elements described above, the current example also includes a core grip 334 having an outer surface 336 sized to be accepted inside the inner bore 312 of the inner sleeve 308. An inner bore 338 is defined by a body of the core grip 334 and extends axially through the core grip 334 for accepting the inner cores 106a, 106b of the two conductor 102a, 102b segments when assembled.

During the assembly of the present example, a first one of the reinforcing cores 106a is inserted through an inner bore 330 of an end cap 320 and through the inner bore 312 of the inner sleeve 308. The second one of the reinforcing cores 106b is inserted through the inner bore 330 of the remaining end cap 320. Next, each of the reinforcing cores 106a, 106b is inserted into the inner bore 338 of the core grip 334. The reinforcing cores 106a, 106b may be cross wired inside the core grip 334 as is already known in the art or may be butted against one another inside the core grip 334. Once the core grip 334 and reinforcing cores 106a, 106b are initially assembled, a radially inward, first stage, compression force is applied through a die via a hydraulic press, by implosion, or by any other crimping technique known in the art.

With the initial stage of assembly complete, the core grip 334 and reinforcing core 106a, 106b assembly is now inserted into the inner bore 312 of the inner sleeve 308. The outer conductor strands 104a, 104b are inserted through the conductor guide apertures 332 in the end caps 320 and into the axially-extending grooves 318 in the inner sleeve 308. Here, the grooves 318 accept the conductor strands 104a, 104b in an overlapping configuration so that a majority of the electrical current flows between the overlapped conductor strands 104a, 104b when the conductors 102a, 102b are transmitting electrical current. Next, the outer splice 302 is guided over the inner sleeve 308 and the end caps 320. Once the connector 300 is initially assembled, a radially inward, second stage, compression force is applied by a die via a hydraulic press, by implosion or by any other crimping technique known in the art.

Referring now to FIGS. 5 through 9, a self-locking connector 400 according to another example of the present disclosure is illustrated. In this example, an outer splice 402 has a tubular shape with an inner diameter surface 404, an outer diameter surface 406 and an axial length. In this example, the axial length of the outer splice 402 is approximately 16.8 inches (42.7 cm), but other lengths may also be used. The inner diameter surface 404 is sized to accept a two-piece, inner sleeve 408a, 408b with each having a body 410 defining an inner bore 412 passing through an axially-extending, central axis 414. An outer rim surface 416 is disposed radially outward from the central bore 412, and one or more axially-extending grooves 418 penetrate into the body 410 at the outer rim surface 416. In this example, four axially-extending grooves 418 are shown; however, in other examples, more or less grooves 418 are contemplated. An end cap 420 has a body 422 with an outer rim surface 424, an inside end 426, an outside end 428, and an inner bore 430 passing coaxially through the central axis 414. One or more conductor-guiding apertures 432 extend axially through the body 422 between the outside end 428 and the inside end 426. In this example, four conductor-guiding apertures 432 are shown, but other numbers are contemplated. In some examples, such as the example of the illustration, the conductor-guiding apertures 432 are round and inclined at an angle to the central axis 414.

In addition to the elements described above, the current example also includes an anchor block 434 having an outer surface 436. An inner bore 437 includes tapered regions 438 for accepting a tapered wedge block 440 into each end. The anchor block 434 and wedge blocks 440 are sized to fit within a counter bore region 442 in each end of the two-piece inner sleeve 408a, 408b.

Each wedge block 440 includes a frustoconical-shaped body 444 defining an inner bore 446 passing through the axially-extending, central axis 414. The extent of the body 444 is defined by a minor diameter end 448, and a major diameter end 450. An outer rim surface 452 is disposed radially outward from the central bore 446, and one or more axially-extending grooves 454 penetrate into the outer rim surface 452. In this example, five axially-extending grooves 454 are shown; however, in other examples, more or less grooves 454 are contemplated. Additionally, one or more through slots 456 extend through the body 444, from the outer rim surface 452 to the inner bore 446, and are disposed between the grooves 454. The slots 456 allow the body 444 to flex inward slightly at the minor diameter end 448 and function as a collet for tightly gripping the reinforcing cores 106a, 106b, as they are driven into the tapered regions 438 of the anchor block 434.

During the assembly of the present example, the reinforcing cores 106a, 106b of the two conductor 102a, 102b segments are inserted through the inner bores 430 of the end caps 420 and into the inner bores 412 of the two-piece inner sleeve 408a, 408b. The cores 106a, 106b are then inserted into the wedge blocks 440. In a first example, the cores 106a, 106b are first inserted through the inner bores 446 of the wedge blocks 440, into the anchor block 434 and then out through the grooves 454 in the opposite wedge block 440. This is referred to as the inside-out configuration. In a second example, the cores 106a, 106b are first inserted through the grooves 454 of the wedge blocks 440, into the anchor block 434 and out through the inner bore 446 of the opposite wedge block 440. This is referred to as the outside-in configuration. Please note that, in each of the above examples, as a tensile load is applied to the reinforcing cores 106a, 106b, the frustoconical wedge blocks 440 are pulled towards one another, into the tapered region 438 of the anchor block 434. The compression of the wedge blocks 440 acts as a collet for holding the reinforcing cores 106a, 106b tightly together.

The outer strands 104a, 104b are then inserted through the conductor guide apertures 432 in the end caps 420 and into the axially-extending grooves 418 in the two piece inner sleeve 408a, 408b. Here, the grooves 418 accept the conductor strands 104a, 104b in an overlapping configuration so that a majority of the electrical current flows between the overlapped conductor strands 104a, 104b when the conductors 102a, 102b are transmitting electrical current. Next, the outer splice 402 is guided over the two piece inner sleeve 408a, 408b and the end caps 420 to complete the initial assembly. Once the connector 400 is initially assembled, a radially inward, single stage, compression force is applied by a die via a hydraulic press, by implosion or by any other crimping technique known in the art.

Figure 10:
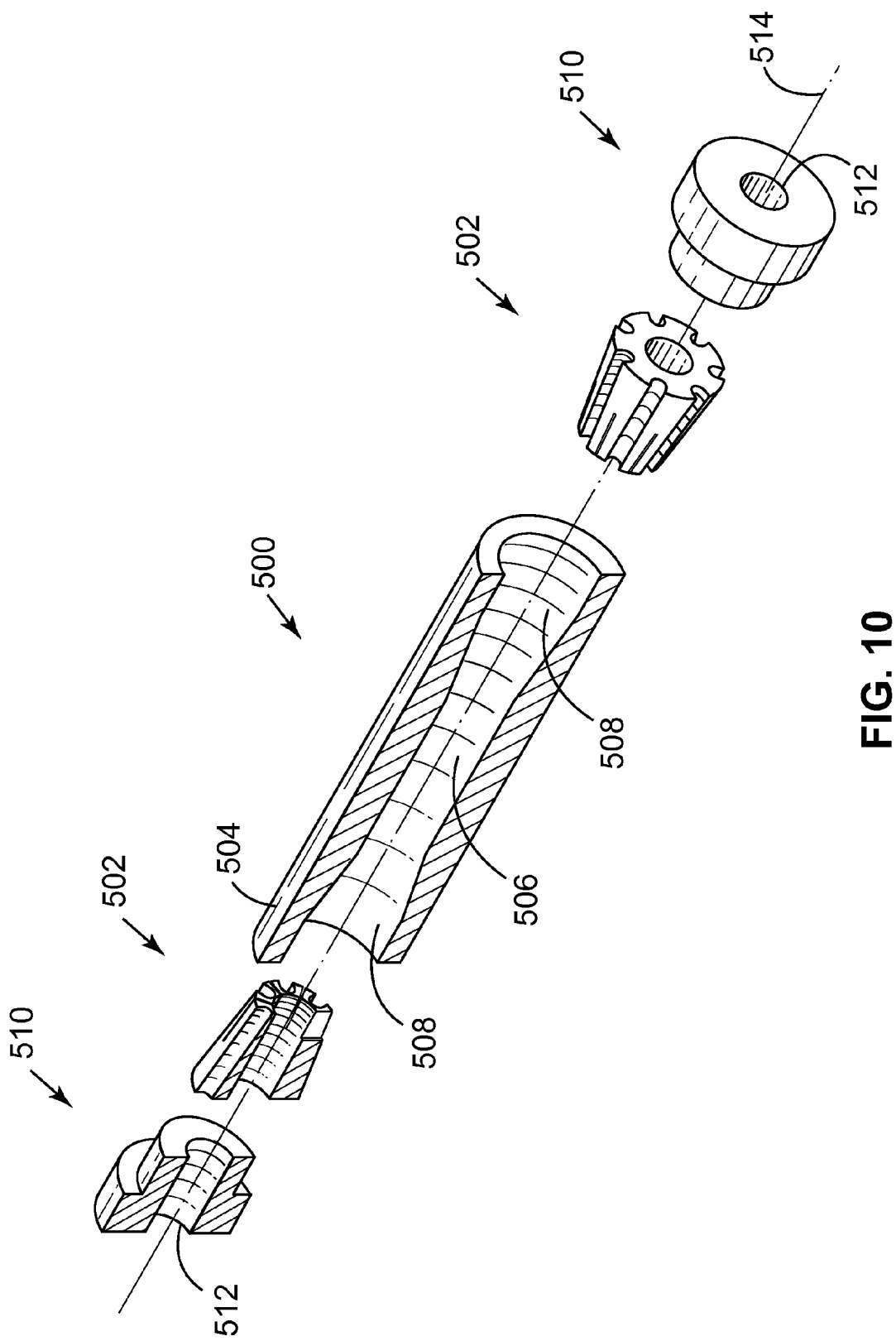
FIG. 10 illustrates an exploded, partial sectional, detailed view of another example of connector features according to the example connector of FIG. 5.

Referring now to FIG. 10, another example of an anchor block 500 and wedge block 502 assembly is shown. In this example, the anchor block 500 has an outer surface 504 sized to be accepted inside the counter bore region 442 of a two-piece inner sleeve 408a, 408b as described earlier and illustrated in FIG. 5. An inner bore 506 includes tapered regions 508 for accepting a wedge block 502 into each end. Other features of the wedge blocks 502 are as described above and will not be repeated for brevity.

Also shown in FIG. 10 are screw type caps 510, which facilitate the full seating of the wedge blocks 502 into the anchor block 500 as the assembly is inserted into the counter bore region 442 in each end of the two-piece inner sleeves 408a, 408b as described above. The caps 510 include a central bore 512 for accepting the reinforcing cores 106a, 106b. The additional friction force between the reinforcing cores 106a, 106b and the tapered regions 508 of the anchor block improve the tension load capability of the assembly.

Figure 11:
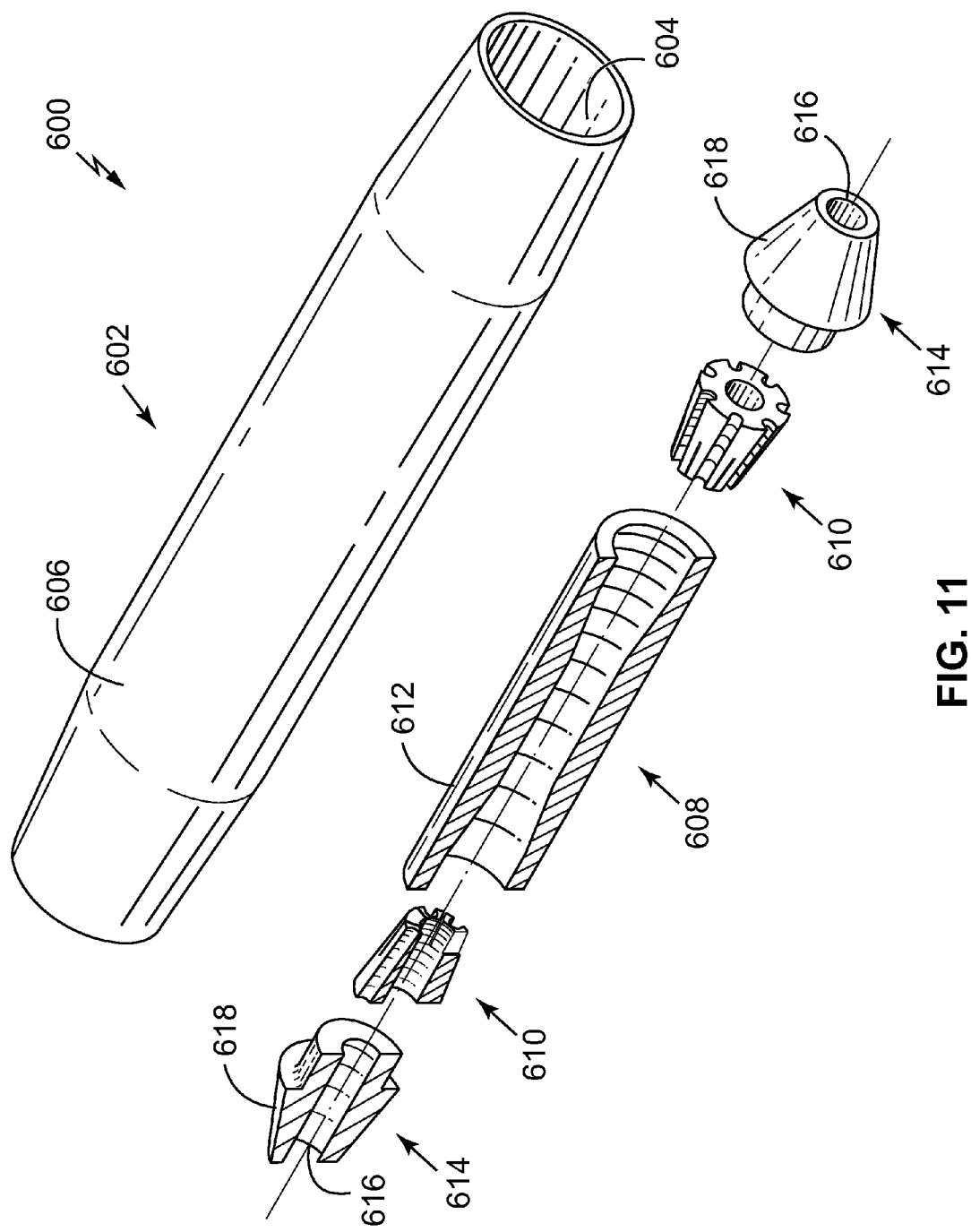
FIG. 11 illustrates an exploded, partial sectional, detailed view of yet another example of a connector according to an example of the present disclosure.

Referring now to FIG. 11, a single-stage connector 600 according to another example of the present disclosure is illustrated. In this example, an outer splice 602 has a tubular shape with an inner diameter surface 604, an outer diameter surface 606, and an axial length. In this example, the axial length of the outer splice 602 is approximately 24 inches (61 cm), but other lengths may also be used. The inner diameter surface 604 is sized to accept an inner sleeve 608 and wedge blocks 610 as described earlier. However, in this particular example, the inner sleeve 608 includes and outer rim surface 612 that has no grooves. Conical caps 614 on each end include central bores 616 and conical outer surfaces 618. The caps 614 force the wedge blocks 610 into the inner sleeve 608 and help guide the outer strands 104a, 104b of the conductors 102a, 102b.

During the assembly of the present example, the steel reinforcing cores 106a, 106b of the two conductors 102a, 102b are inserted through the bores 616 of the conical caps 614 and are locked with the wedge blocks 610 and inner sleeve 608 as described above. The outer strands 104a, 104b are inserted around the conical surface 618 and around the outer rim surface 612 of the inner sleeve 608. Next, the outer splice 602 is guided over the inner sleeve 608 and the conical caps 614 to complete the initial assembly. Note that, in this example, the outer strands 104a, 104b overlap in the annular region formed between the inner sleeve 608 and the outer splice 602 in an overlapping configuration so that a majority of the electrical current flows between the overlapped strands 104a, 104b when the conductors 102a, 102b are transmitting electrical current. Once the connector 600 is initially assembled, a radially inward, single stage, compression force is applied by a die via a hydraulic press, by implosion or by any other crimping technique known in the art.

Figure 12:
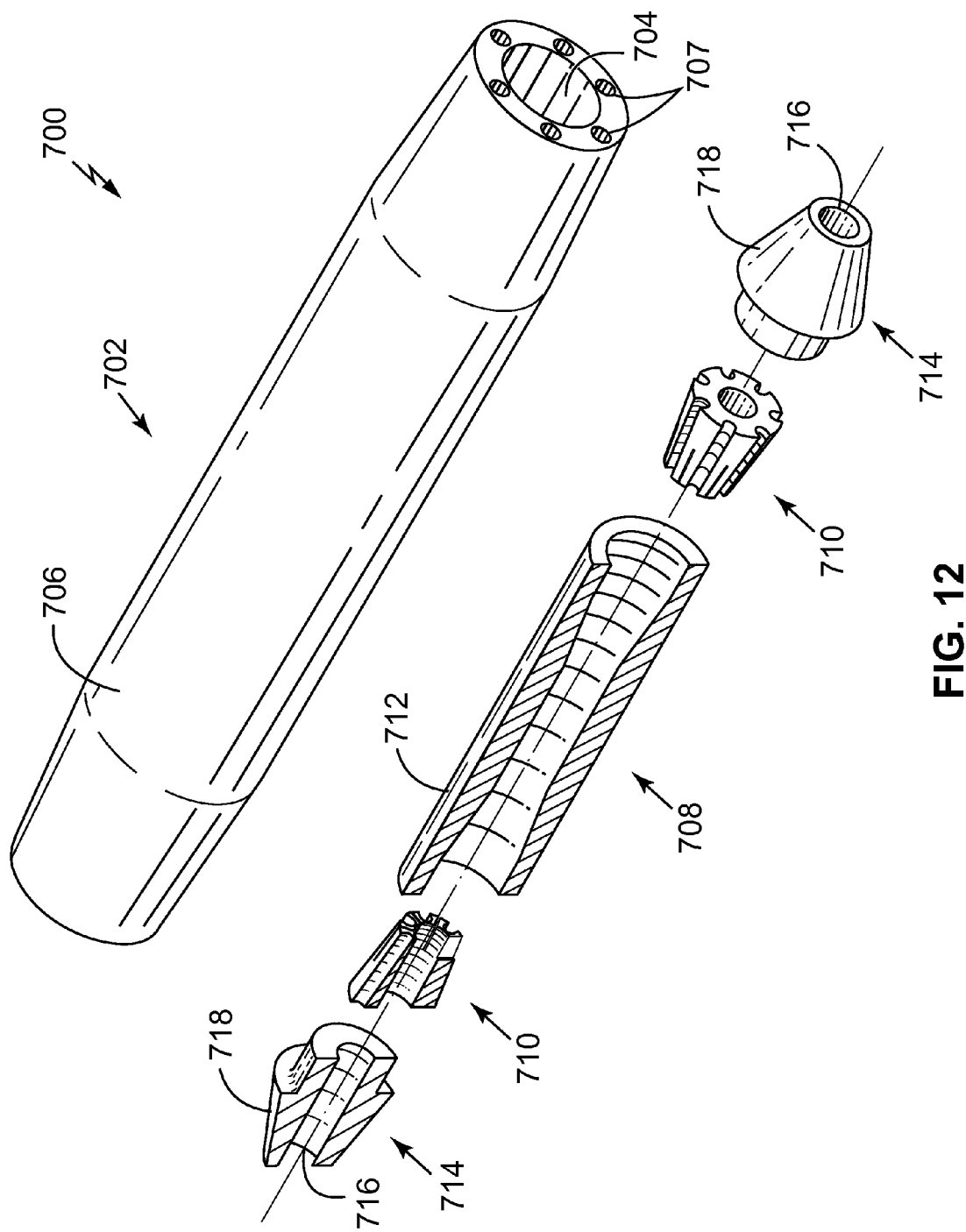
FIG. 12 illustrates an exploded, partial sectional, detailed view of yet another example of a connector according to an example of the present disclosure.

Referring now to FIG. 12, a single-stage connector 700 according to another example of the present disclosure is illustrated. In this example, an outer splice 702 has a tubular shape with an inner diameter surface 704, an outer diameter surface 706, and an axial length. In this example, the axial length of the outer splice 702 is approximately 24 inches (61 cm), but other lengths may also be used. Also included in this example are one or more axially-extending, apertures 707 disposed between the inner diameter surface 704 and the outer diameter surface 706. In some examples, the axially-extending, apertures 707 are equally spaced about the outer splice 702. The inner diameter surface 704 is sized to accept an inner sleeve 708 and wedge blocks 710 as described earlier. In this example, the inner sleeve 708 includes an outer rim surface 712 that has no grooves. Conical caps 714 on each end include central bores 716 and conical outer surfaces 718. The caps 714 force the wedge blocks 710 into the inner sleeve 708 and help guide the outer strands 104a, 104b of the conductors 102a, 102b.

During the assembly of the present example, the reinforcing cores 106a, 106b of the two conductors 102a, 102b are inserted through the bores 716 of the conical caps 714 and are locked with the wedge blocks 710 and inner sleeve 708 as described above. The outer strands 104a, 104b are inserted around the conical surface 718 of the conical caps 714. Next, the outer splice 702 is guided over the inner sleeve 708 and the conical caps 614 to complete the initial assembly. Note that, in this example, the outer strands 104a, 104b overlap in the apertures 707 in the outer splice 702 in an overlapping configuration so that a majority of the electrical current flows between the overlapped strands 104a, 104b when the conductors 102a, 102b are transmitting electrical current. Once the connector 700 is initially assembled, a radially inward, single stage, compression force is applied by a die via a hydraulic press, by implosion or by any other crimping technique known in the art.

Figure 13:
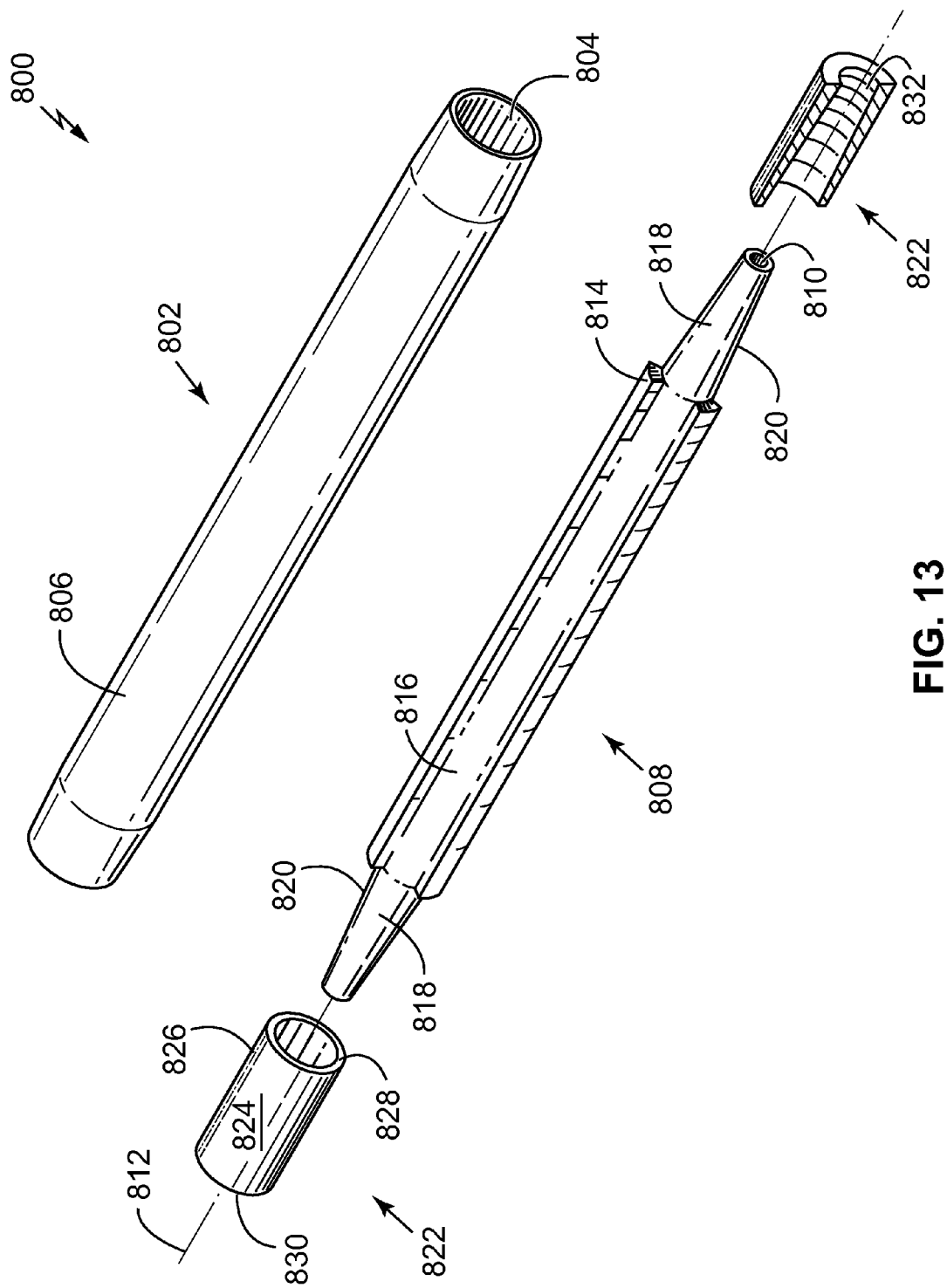
FIG. 13 illustrates an exploded, partial sectional, view of yet another example of a connector according to an example of the present disclosure.

Referring lastly to FIG. 13, a single-stage connector 800 according to an example of the present disclosure is illustrated. In this example, an outer splice 802 has a tubular shape with an inner diameter surface 804, an outer diameter surface 806, and an axial length. In this example, the axial length of the outer splice 802 is approximately 24 inches (61 cm), but other lengths may also be used. The inner diameter surface 804 is sized to accept an inner sleeve 808 that has a body defining an inner bore 810 passing through an axially-extending, central axis 812. An outer rim surface 814 is disposed radially outward from the central bore 810, and one or more axially-extending grooves 816 penetrate into the outer rim surface 814. In this example, three axially-extending grooves 816 are shown; however, in other examples, more or less grooves 816 are contemplated. The grooves 816 may have a convex-shaped bottom surface (shown), a concave-shaped bottom surface, or the bottom surface may be otherwise shaped (e.g., flat, V-shaped). The inner sleeve 808 also has ends 818 with tapered surfaces 820 that are sized and shaped to fit within corresponding end caps 822. Each end cap 822 has a body 824 with an outer rim surface 826, an inside end 828, an outside end 830, and a tapered bore surface 832 passing coaxially through the central axis 812.

During the assembly of the present example, the reinforcing cores 106a, 106b of the two conductor 102a, 102b segments are inserted through the tapered bores 832 of the end caps 822 and into the inner bore 810 of the inner sleeve 808. The reinforcing cores 106a, 106b may be cross wired inside the sleeve as is known in the art or may be simply butted together. The outer strands 104a, 104b are inserted through the tapered bores 832 of end caps 822, over the tapered surfaces 820, and into the axially-extending grooves 816 in the inner sleeve 808. Here, the grooves 816 accept the outer strands 104a, 104b in an overlapping configuration so that a majority of the electrical current flows between the overlapped outer strands 104a, 104b when the conductors 102a, 102b are transmitting electrical current. Next, the outer splice 802 is guided over the inner sleeve 808 and the end caps 822 to complete the initial assembly. Once the connector 800 is initially assembled, a radially inward, single stage, compression force is applied by a die via a hydraulic press, by implosion or by any other crimping technique known in the art.

Each of the disclosed connector examples may be of a strong, ductile, light-weight material that is compatible with the aluminum conductor steel reinforced (ASCR) overhead lines. While aluminum materials were used for the elements described in the disclosed examples, other materials with the appropriate properties may similarly be used.

A finite element model (FEM) of the present ultra-high performance connector was analyzed at Oak Ridge National Laboratory in Oak Ridge, Tenn. The transient model simulated an assembled connector and hydraulic forming mechanism during the crimping process and immediately after the die was removed. It was determined from the model that there was a relaxation of clamping residual stress at the reinforcing core and inner sleeve interface of about forty-nine percent. A similar model was made for a conventional aluminum conductor steel reinforced-single stage splice (ACSR-SSC) connector, and it was determined from the model that there was a relaxation of clamping residual stress at the reinforcing core and core grip interface of about seventy-seven percent. For further details of the analysis, please see the following references [1] Jy-An Wang, Edgar Lara-Curzio, Thomas King, Joe Raziano, John Chan, "The Integrity of ACSR Full Tension Splice Connector at Higher Operation Temperature", IEEE Transactions on Power Delivery, 2008, Vol. 23(2), pp. 1158-1165. [2] Jy-An Wang, John Chan, Joe Raziano, "The Lifetime Estimate for ACSR Single Stage Splice Connector Operated at Higher Temperatures", IEEE Transactions on Power Delivery, 2011, Vol. 26(3), pp. 1317-1325, which are hereby incorporated by reference.

Table 1 below compares the performance of the present connector with the performance of a conventions, ACSR-SSC-24, connector.

TABLE 1

FEM Results Comparison at Core Grip Interface

|  | ACSR-SSC 24 inch in length with a 60-ton die (5-in core grip) | Present connector with 100-ton die |
|---|---|---|
| Crimp force required for each die | 54.6 tons | 100 tons |
| Friction resistance | 36,000 lb (5-inch core grip) | 78,816 lb (5-inch core grip) |

In this invention, 3H (High-reliability and High-ampacity at High temperature) connectors are designed for bare overhead power transmission conductors operating at high temperatures. The current design significantly improves the mechanical integrity of the connectors and increases the electrical conductance of the systems as well. Thus, these new connector systems can enhance the efficiency, reliability, and safety of power transmission systems.

While this disclosure describes and enables several specific examples of connectors for high power transmission lines, other examples and applications are contemplated. Accordingly, the invention is intended to embrace those alternatives, modifications, equivalents, and variations as fall within the broad scope of the appended claims. The technology disclosed and claimed herein is available for licensing in specific fields of use by the assignee of record.

The invention claimed is:

1. An apparatus for connecting the free ends of two electrical power transmission line segments having conductor strands disposed around a central, reinforcing core, the apparatus comprising:
   an inner sleeve having a body defining an inner bore passing through an axially-extending, central axis, an outer rim surface disposed radially outward from the central bore, and one or more axially-extending grooves penetrating the body at the outer rim surface;
   an outer splice having a tubular shaped body with a bore passing coaxially through the central axis, the bore defining an inner diameter surface for accepting said inner sleeve; and
   wherein the inner bore of the inner sleeve accepts the reinforcement cores of the two conductors when assembled, and the grooves accept the conductor strands in an overlapping configuration when assembled so that a majority of the electrical current flows between the overlapped conductor strands when the conductors are transmitting electrical current.

2. The apparatus as recited in claim 1 further comprising:
   an end cap having a body with an outer rim surface, and an inner bore passing coaxially through the central axis and one or more conductor-guiding apertures through the body;
   wherein said cap aligns with said inner sleeve so that the outer rim surface fits inside the inner diameter surface of said outer splice, with the inner bore accepting the reinforcement cores and the one or more conductor-guiding apertures for accepting the conductor strands and properly positioning them about the outer rim surface of said inner sleeve when assembled.

3. The apparatus as recited in claim 2 and further comprising a core grip having a body with a bore passing coaxially through the central axis for accepting the reinforcing cores when assembled, and an outer rim that is sized to fit inside the inner bore of said inner sleeve.

4. The apparatus of claim 2 and further comprising an anchor block and two wedge blocks, with each having a body defining a bore passing coaxially through the central axis for accepting the reinforcing cores, and an outer rim that is sized to fit inside the inner bore of the inner sleeve, wherein said anchor block and said two wedge blocks have tapered surfaces that cooperate to lock the reinforcing cores in a collet-like configuration when assembled.

5. The apparatus of claim 4 wherein said wedge blocks comprise a body having a frustoconical shaped outer rim surface and one or more axially-extending grooves interspersed with slots in the body at the outer rim surface.

6. The apparatus of claim 5 wherein said wedge blocks accept the reinforcing cores in an inside-out configuration when assembled.

7. The apparatus of claim 5 wherein said wedge blocks accept the reinforcing cores in an outside-in configuration when assembled.

8. The apparatus as recited in claim 1 wherein the axially-extending grooves in said inner sleeve have a concave shaped bottom surface.

9. The apparatus as recited in claim 1 wherein the axially-extending grooves in said inner sleeve have a convex shaped bottom surface.

10. The apparatus as recited in claim 2 wherein said inner sleeve includes an external, conical-shaped surface on each end and each end cap includes an internal, conical-shaped surface that cooperate together with the external, conical surfaces to guide the conductors into the axially-extending grooves in the body of said inner splice when assembled.

11. An apparatus for connecting the free ends of two electrical power transmission line segments having conductor strands disposed around a central, reinforcing core, the apparatus comprising:
   an inner sleeve having a body defining an inner bore passing through an axially-extending, central axis, and an outer rim surface disposed radially outward from the central bore;
   an outer splice having a tubular shaped body with a bore passing coaxially through the central axis, the bore defining an inner rim surface for accepting said inner sleeve and defining an annular region there between; and
   wherein the inner bore of the inner sleeve accepts the reinforcement cores of the two conductors when assembled, and the conductor strands are accepted in an overlapping configuration in the region between said inner sleeve and said outer splice when assembled so that a majority of the electrical current flows between the overlapped conductor strands when the conductors are transmitting electrical current.

12. The apparatus as recited in claim 11 further comprising:
   an end cap having a conical shaped body with a conical outer surface, and an inner bore passing coaxially through the central axis;
   wherein said cap aligns with said inner sleeve so that the conical outer surface fits inside the inner diameter surface of said outer splice, with the inner bore accepting the reinforcement cores when assembled and the conical outer surface for accepting the conductor strands when assembled and properly positioning them about the outer rim surface of said inner sleeve.

13. An apparatus for connecting the free ends of two electrical power transmission line segments having conductor strands disposed around a central, reinforcing core, the apparatus comprising:
  an inner sleeve having a body defining an inner bore passing through an axially-extending, central axis, and an outer rim surface disposed radially outward from the central bore;
  an outer splice having a tubular shaped body with a bore passing coaxially through the central axis, the bore defining an inner rim surface for accepting said inner sleeve, said body also defining one or more axially-extending apertures; and
  wherein the inner bore of the inner sleeve accepts the reinforcement cores of the two conductors when assembled, and the conductor strands are accepted in an overlapping configuration in the one or more axially-extending apertures in said outer splice when assembled so that a majority of the electrical current flows between the overlapped conductor strands when the conductors are transmitting electrical current.

14. The apparatus as recited in claim 13 wherein the axially-extending apertures are equally spaced about said outer splice body.

* * * * *